(12) United States Patent
de Wergifosse

(10) Patent No.: US 8,958,181 B2
(45) Date of Patent: Feb. 17, 2015

(54) ELECTRICAL SYSTEM FOR STARTING UP AIRCRAFT ENGINES

(75) Inventor: Eric de Wergifosse, Saint Augustin (FR)

(73) Assignee: Hispano Suiza, Colombes (FR)

( * ) Notice: Subject to any disclaimer, the term of this patent is extended or adjusted under 35 U.S.C. 154(b) by 881 days.

(21) Appl. No.: 13/143,848

(22) PCT Filed: Jan. 8, 2010

(86) PCT No.: PCT/FR2010/050026
§ 371 (c)(1),
(2), (4) Date: Jul. 8, 2011

(87) PCT Pub. No.: WO2010/079308
PCT Pub. Date: Jul. 15, 2010

(65) Prior Publication Data
US 2011/0273011 A1    Nov. 10, 2011

(30) Foreign Application Priority Data
Jan. 9, 2009   (FR) ...................................... 09 50102

(51) Int. Cl.
*H02J 3/26*     (2006.01)
*H02M 7/493*    (2007.01)
*H02P 1/00*     (2006.01)

(52) U.S. Cl.
CPC  *H02M 7/493* (2013.01); *H02P 1/00* (2013.01)
USPC ............................................. 361/29; 307/9.1

(58) Field of Classification Search
CPC ..... F02N 11/0866; F02N 11/087; H02J 9/062
USPC .............................................. 307/9.1; 361/29
See application file for complete search history.

(56) References Cited

U.S. PATENT DOCUMENTS 3,614,528 A  *  10/1971  Craddock ................. 315/241 R
5,811,037 A  *   9/1998  Ludwig ........................ 264/40.1
(Continued)

FOREIGN PATENT DOCUMENTS

CN       2257418   *  7/1997   ............... H02H 7/08
DE     100 18 668       10/2001
(Continued)

OTHER PUBLICATIONS

International Search Report Issued Jul. 30, 2010 in PCT/FR10/050026 filed Jan. 8, 2010.

*Primary Examiner* — Zeev V Kitov
(74) *Attorney, Agent, or Firm* — Oblon, Spivak, McClelland, Maier & Neustadt, L.L.P.

(57) ABSTRACT

An electrical system for starting an engine is provided. The system includes: an AC/DC rectifier powered by an AC power network to deliver a first DC voltage $V_{dc}$, a DC/AC converter module for delivering an AC voltage for starting the engine from said first DC voltage $V_{dc}$, and k n-phase inverters arranged in parallel (k>1) and each delivering power no greater than half a maximum power $P_{max}$ required for starting the engine, and the two power supply lines of each of the inverters are connected to an electronic protection device receiving the first DC voltage $V_{dc}$, and the n outputs of each of the inverters delivering the AC voltage for starting the engine via n respective series inductors.

14 Claims, 8 Drawing Sheets

(56) References Cited

U.S. PATENT DOCUMENTS

| | | | |
|---|---|---|---|
| 6,488,608 B2 * | 12/2002 | Yamaguchi et al. | 477/3 |
| 8,331,119 B2 * | 12/2012 | Plaideau et al. | 363/132 |
| 2004/0141347 A1 | 7/2004 | Naito et al. | |
| 2009/0296433 A1 * | 12/2009 | Sihler et al. | 363/65 |

FOREIGN PATENT DOCUMENTS

| | | |
|---|---|---|
| JP | 5 103418 | 4/1993 |
| JP | 2003 209973 | 7/2003 |

* cited by examiner

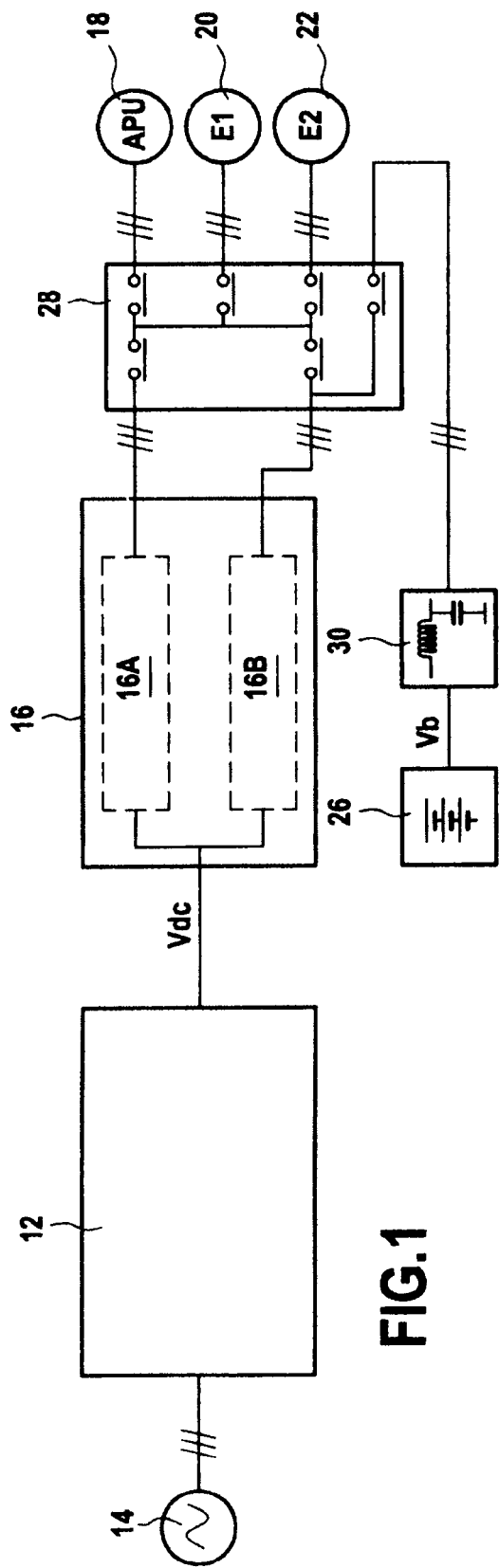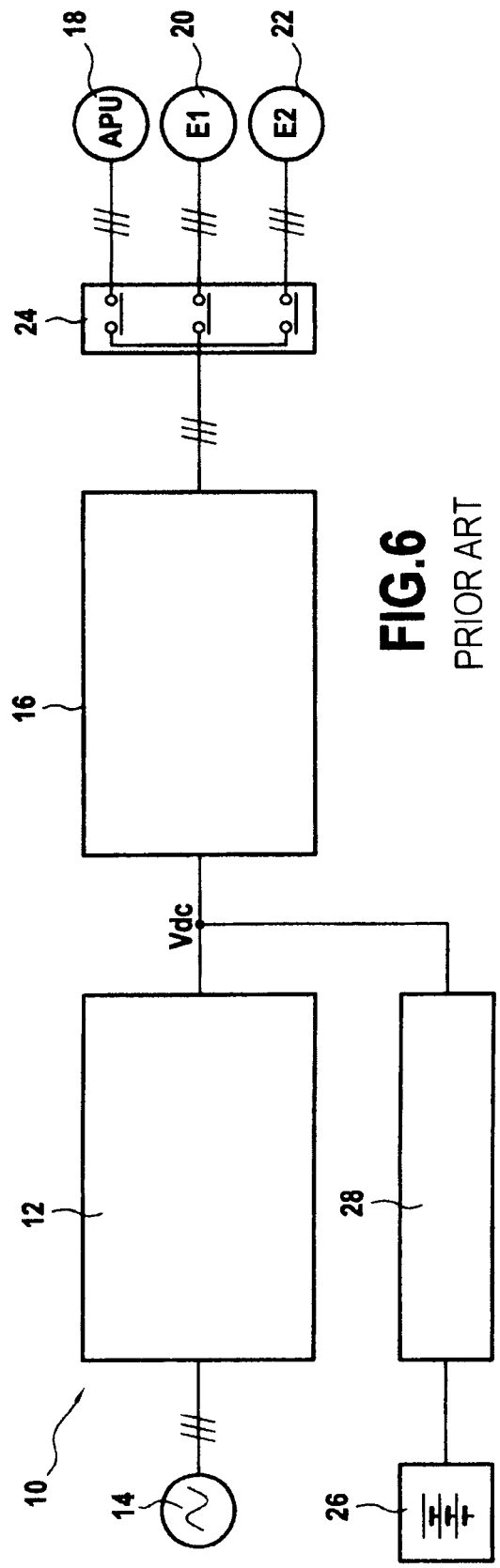

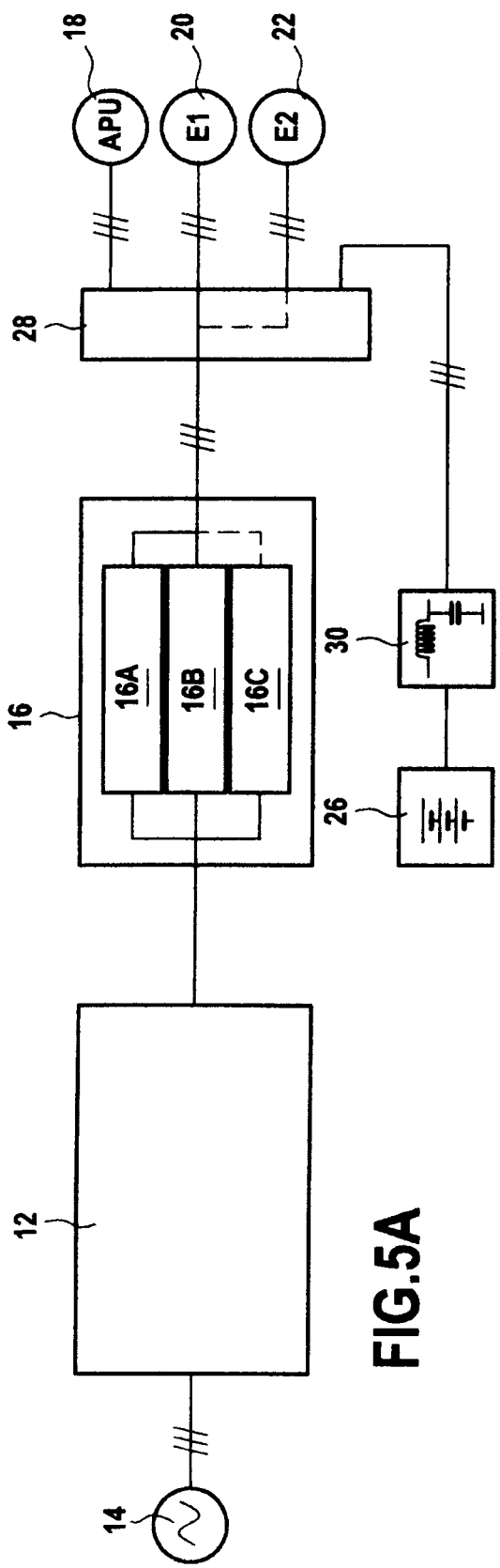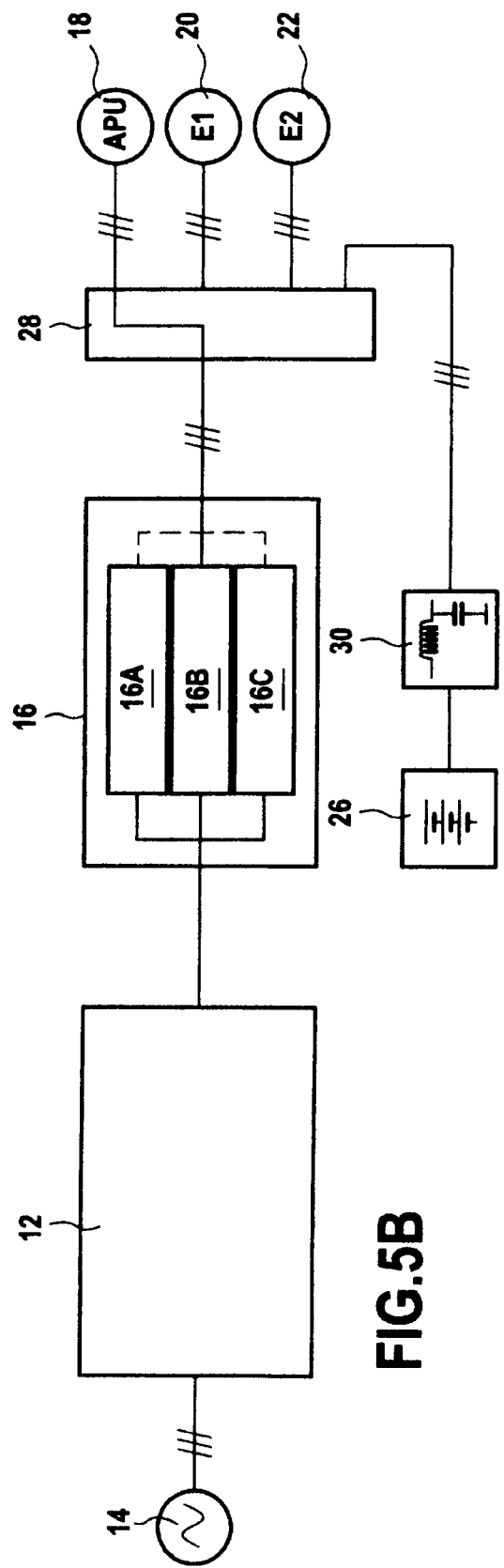

ELECTRICAL SYSTEM FOR STARTING UP AIRCRAFT ENGINES

FIELD OF THE INVENTION

The present invention relates to the field of power converters, and it relates more particularly to systems for starting aeroengines.

PRIOR ART

In the field of aviation, it is known to start propulsion engines and the auxiliary power unit (APU) of an aircraft from an electrical starter system of the type shown in FIG. 6. Such a system 10 conventionally comprises an alternating current to direct current (AC/DC) rectifier 12 for obtaining a DC voltage $V_{dc}$ from the power supply network 14 on board the aircraft or from a generator unit on the ground, followed by a DC/AC converter 16 for powering the starter-generators 18, 20, 22 of the associated engines (via a connection matrix 24) while the engines are being started. The DC/AC converter 16 generally comprises an inverter having a power level "Pn" sufficient to start a propulsion engine on the ground. In order to improve reliability concerning the ability to re-start an engine in flight and the availability (dispatch reliability) for starting on the ground, a second inverter having the same power "Pn" may be added. Nevertheless, such an addition uses up weight and volume and thus represents additional costs.

The power supply network is conventionally a 115 $V_{ac}$ power supply network or any other network, such as a 230 $V_{ac}$ network. The DC voltage obtained at the outlet from the rectifier may for example be 270 $V_{dc}$ or 540 $V_{dc}$, etc.

When an electrical power supply network is not available, propulsion engines may be started from the APU, which itself can be started from a battery. It is then necessary to add a DC/DC converter 28 that delivers a voltage that is compatible with the input voltage of the inverter to which it is connected. Conventional battery voltages lie in the range 24 $V_{dc}$ to 48 $V_{dc}$ so this boost DC/DC converter comprises multiple stages or cells, possibly including electrical isolation, and necessarily presents a high boost ratio, typically greater than 10, and thus constitutes equipment that is complex and difficult to regulate, heavy, and voluminous, and thus ends up being particularly expensive.

OBJECT AND DEFINITION OF THE INVENTION

The present invention thus proposes to mitigate the above-mentioned drawbacks and more particularly to minimize the weight of equipment needed for enabling propulsion engines and the APU of an aircraft to be started from a power network or from a battery, with a high level of reliability for re-starting in flight, and if necessary also with a dispatch reliability level that is sufficiently high for starting on the ground.

These objects are achieved by an electrical system for starting at least one engine, the system comprising: an AC/DC rectifier powered by an AC power network to deliver a first DC voltage $V_{dc}$; and a DC/AC converter module for delivering a starting AC voltage to said at least one engine from said first DC voltage $V_{dc}$; the system being characterized in that said DC/AC converter module comprises k n-phase inverters arranged in parallel (k>1), each delivering power that is no greater than half a maximum power $P_{max}$ required for starting said at least one engine, and in that the two power supply lines of each of said inverters are connected to an electronic protection device receiving said first DC voltage $V_{dc}$, and the n outputs from each of said inverters deliver said starting AC voltage for said engine via n respective series inductors.

In the envisaged configuration, said DC/AC converter module comprises at least two inverters, and each of said k inverters delivers a power $P_{max}/k$, or at least three inverters and each of said k inverters delivers a power $P_{max}/(k-1)$.

Thus, in either of these configurations in which the DC/AC conversion is subdivided into parallel inverter sections, each of power no greater than P/2, the size of the electrical starter system in terms of weight and volume is considerably reduced as is its overall cost. For this configuration to be advantageous, it is essential for at least one of the engines to require power that is less than $1/(k-1)$ times said maximum power, and/or to be capable of starting under safety-critical conditions with power that is less than $1/(k-1)$ times said maximum power.

Advantageously, said DC/AC converter module may include two or three three-phase inverters arranged in parallel. However a configuration with more than three inverters is naturally possible, depending on the maximum power involved.

When said at least one engine of the electrical starter system is capable of starting under safety-critical conditions with said power that is less than half the maximum power, said at least one engine is powered by only one of said two three-phase inverters so as to increase the reliability level of the system in said safety-critical conditions by using redundancy of 1 on 2 type.

Advantageously, said at least one engine is powered by two of said three three-phase inverters so as to increase the reliability level of the system by using redundancy of 2 on 3 type.

Said electrical starter system is applied to starting from a battery and said at least one engine of the electrical starter system is capable of starting with said power of less than half the maximum power, said battery is connected to one of said n-phase inverters via said n series inductors so as to form a DC/DC boost converter for delivering said DC voltage $V_{dc}$, which DC voltage $V_{dc}$ as applied to another one of said n-phase inverters via said electronic protection device acts via said n series inductors to deliver said AC voltage enabling said at least one engine to start from said battery when the AC power network is not available.

Preferably, in order to obtain the DC voltage $V_{dc}$ from the battery, the DC/DC boost converter is controlled by a control circuit switching at a duty ratio that is constant.

Advantageously, said electronic protection device includes a controlled switch in series in one of the two power supply lines and a capacitor in parallel across said two power supply lines beside said inverter.

Preferably, the electrical starter system of the invention further includes a filter arranged at the outlet from said battery.

BRIEF DESCRIPTION OF THE DRAWINGS

The characteristics and advantages of the present invention appear better from the following description made by way of non-limiting indication and with reference to the accompanying drawings, in which:

FIG. 1 is a block diagram showing an electrical system in accordance with the present invention for starting engines;

FIGS. 5A to 5D show various other operating configurations of the FIG. 1 system; and FIG. 6 is a block diagram of a prior art electrical system for starting engines.

DETAILED DESCRIPTION OF A PREFERRED EMBODIMENT

Figure 1A:
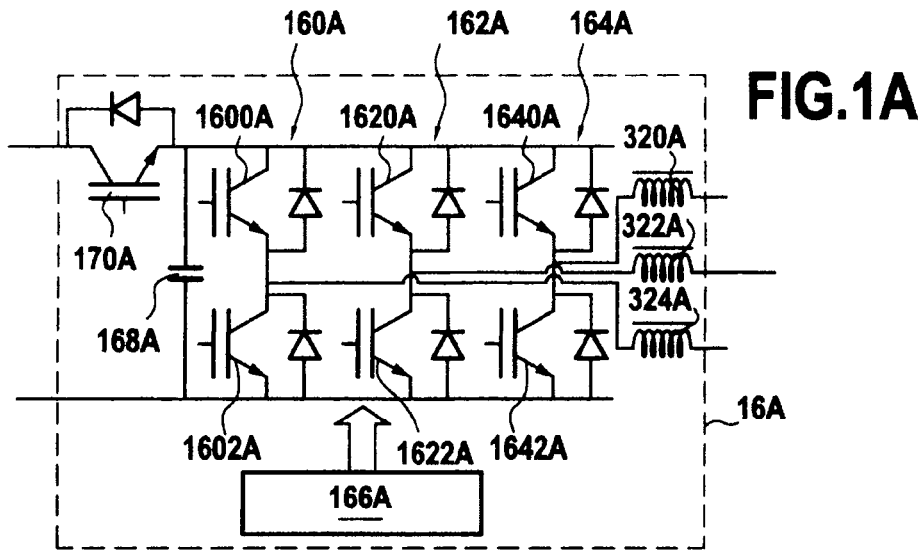
FIGS. 1A and 1B show details of a DC/AC converter module of the FIG. 1 system.

FIG. 1 is a block diagram showing the electrical system of the invention for starting engines.

As in prior art systems, there can be seen the AC/DC rectifier 12 used for rectifying the alternating voltage delivered by the power supply network 14, advantageously a three-phase network, and followed in like manner by a DC/AC converter 16 powering various starter-generators 18, 20, 22 via a connection matrix in which the positions of the various contactors shown by way of example enables various different operating modes to be implemented. Nevertheless, the matrix 28 is significantly different in order to incorporate an additional channel coming from the battery 26 that, unlike prior art systems, is not followed by a DC/DC converter but merely by a conventional filter 30 having its output connected directly to the output of the DC/AC converter via the connection matrix 28. It should be observed that the omission of the DC/DC converter reduces the number of semiconductor devices and has the consequence of improving the overall mean time between failures (MTBF) of the system.

According to the invention, this converter is constituted by a plurality of parallel DC/AC converter sections of identical bidirectional structure that is described below with reference to FIG. 1A.

Each section of the DC/AC converter (e.g. the first section 16A) includes at least one electronic protection device (ideally a controlled electronic switch 170A, e.g. an insulated-gate bipolar transistor (IGBT) together with an antiparallel diode, associated with a capacitor 168A), a conventional n-phase inverter (conventionally three-phase as shown), and a set of n inductors 320A, 322A, 324A respectively in series with the n outputs of the inverter.

More precisely, the three-phase inverter shown comprises two power supply lines, one forming a ground line, with three branches connected between them, each branch having two switches in series. The connection point between the two switches 1600A, 1602A forming the first branch 160A is connected to one end of a first inductor 324A at the outlet from the inverter, its other end being connected to a line for powering a starter-generator 18, 20, 22 via the connection matrix 28. Similarly, the connection point between the two switches 1620A, 1622A of the second branch 162A of the inverter is connected to the end of the second inductor 322A. Finally, the connection point between the two switches 1640A, 1642A of the third branch 164A is connected to the end of the third inductor 320A. These switches are conventionally IGBTs having respective antiparallel diodes connected across their terminals with the switching thereof being controlled by a control circuit 166A that also serves to control the switch 170A.

More generally, the DC/AC converter 16 may comprise k n-phase inverters arranged in parallel (where k>1) so as to be capable of delivering a power of $P_{max}/k$ or of $P_{max}(k-1)$, where $P_{max}$ is the power required for starting engines under conditions that require the maximum power level. This principle of subdividing into k inverter sections, each of power that is no greater than half the maximum power $P_{max}$ can be generalized. Thus, depending on the application and the power level, the parameter k becomes a variable for optimizing weight and/or cost.

Figure 1B:
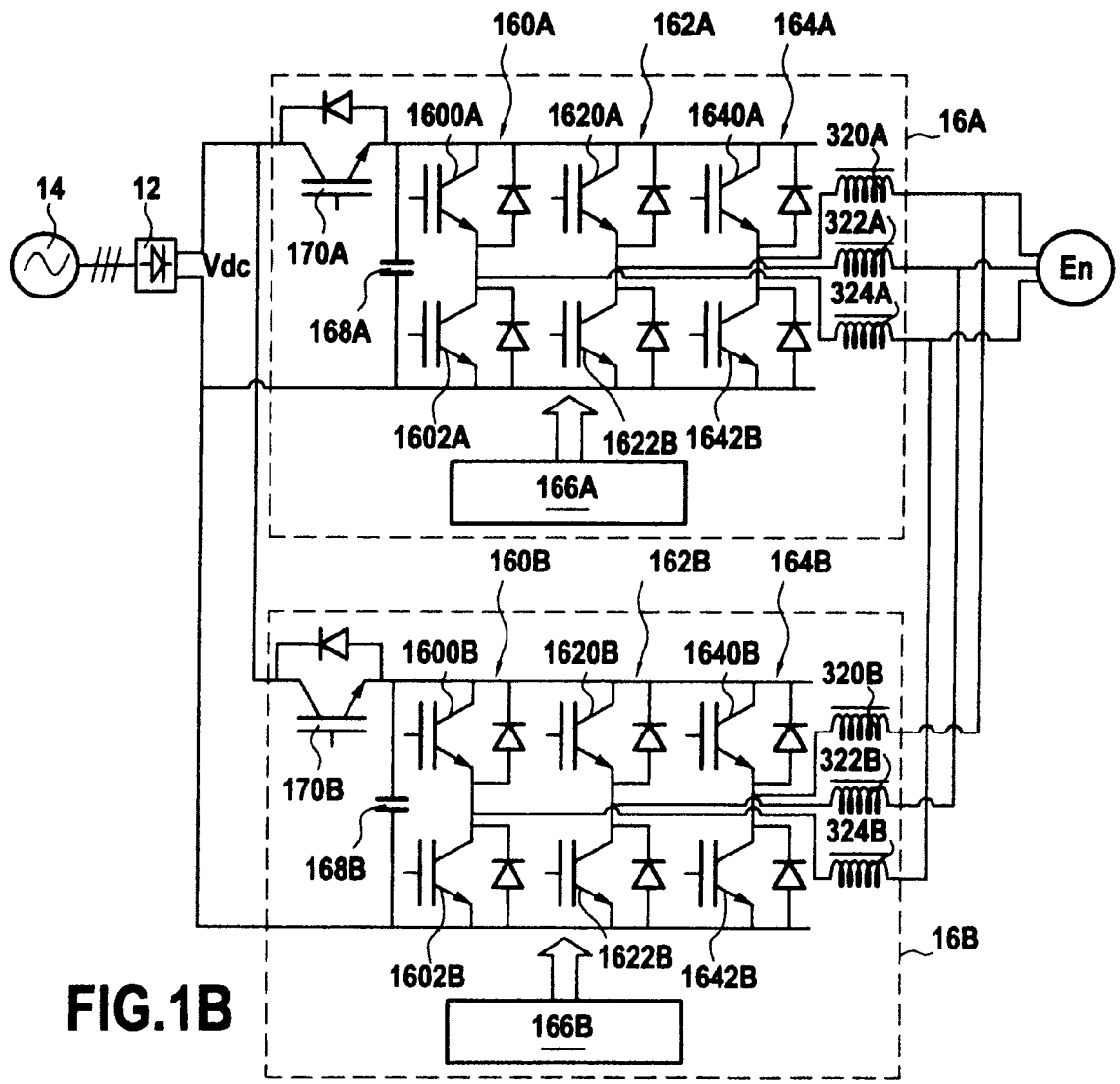

FIG. 1B shows a particular mode of operation for the FIG. 1 electrical system for starting engines, in which one of the maximum power engines is started from the power network 14 via the AC/DC rectifier 12 and powered by two DC/AC converter sections 16A and 16B (the contactors in question in the connection matrix 28 are assumed to be closed and therefore not shown). Each section is dimensioned to deliver power at a level $P_{max}/2$.

Naturally, there can be seen the structure described with reference to FIG. 1A, which structure is duplicated in this particular operating configuration, each section having its own control circuit 166A, 166B acting conventionally, each via its own current control loop associated with the three output inductors of the three-phase inverter, to ensure a balanced distribution of the maximum power delivered to the starter-generator of the engine in question. In this configuration, the switches 170A, 170B prevent a short-circuit type fault between the power supply lines delivering the DC voltage $V_{dc}$ propagating between the sections of the inverter.

FIGS. 2A to 2D are diagrams showing various different possible modes of operation using the electrical system of the invention for starting engines.

Figure 2A:
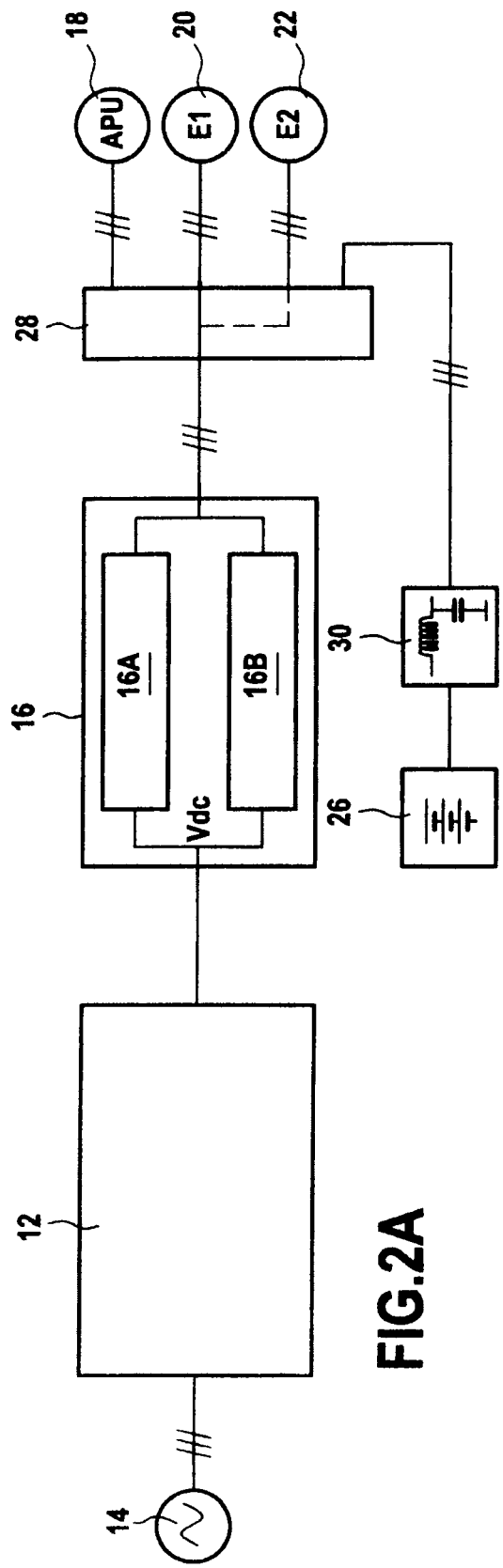
FIGS. 2A to 2D show various operating configurations of the FIG. 1 system.

FIG. 2A is a diagram showing the structure described above with reference to FIG. 1B and it corresponds, for example when starting the engines of an aircraft, to the situation in which it is desired only to obtain an in-flight re-starting level of reliability. In this configuration, the system has two DC/AC converter sections 16A and 16B, in which the two inverters of power $P_n/2$ are coupled together and synchronized so as to deliver the power $P_n$ required for starting on the ground.

Figure 2B:
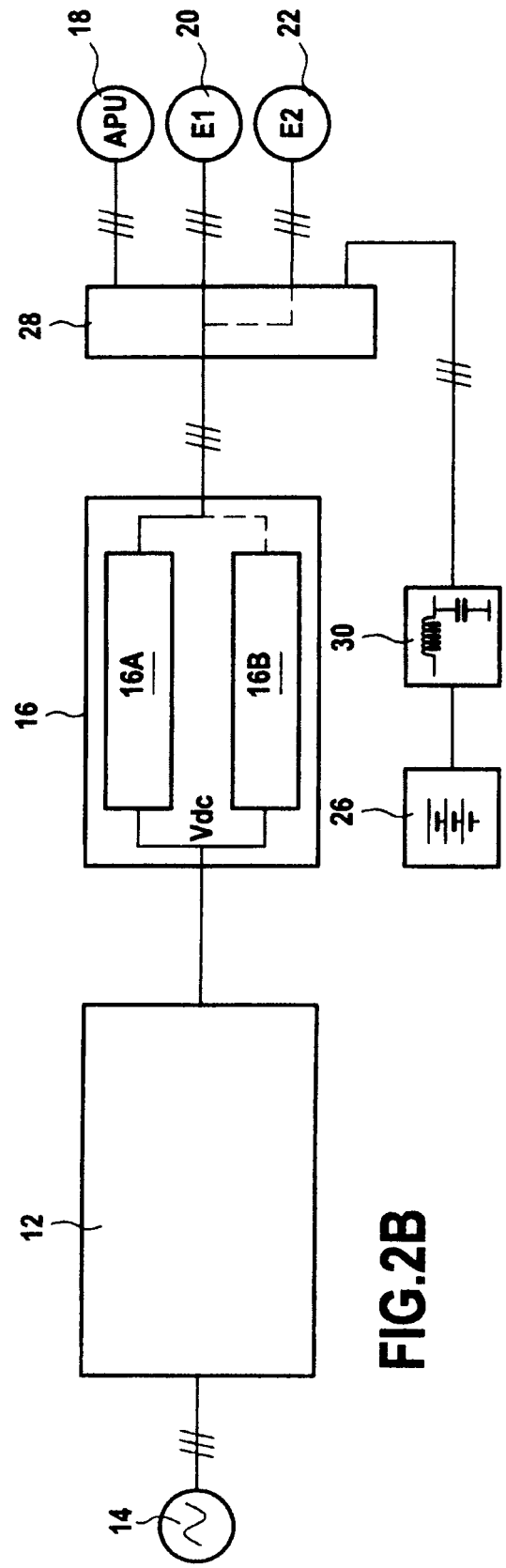

For re-starting in flight, the power required is generally less than $P_n/2$, and a single DC/AC converter section suffices, so as shown in FIG. 2B, one or other of the propulsion engines 20, 22 can be re-started from the power network 14, thereby providing 1 on 2 redundancy in order to ensure a high level of reliability.

Figure 2C:
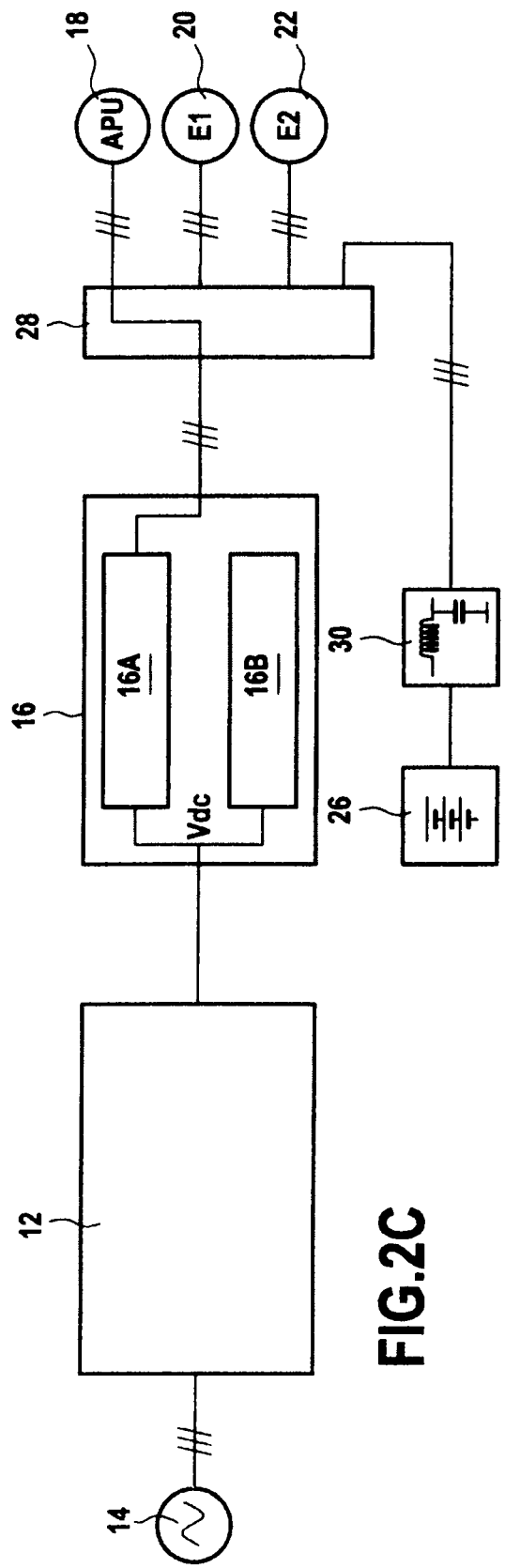

An identical configuration can be seen in FIG. 2C for starting the APU, since it generally requires less power, and in particular power considerably less than $P_n/2$.

Figure 2D:
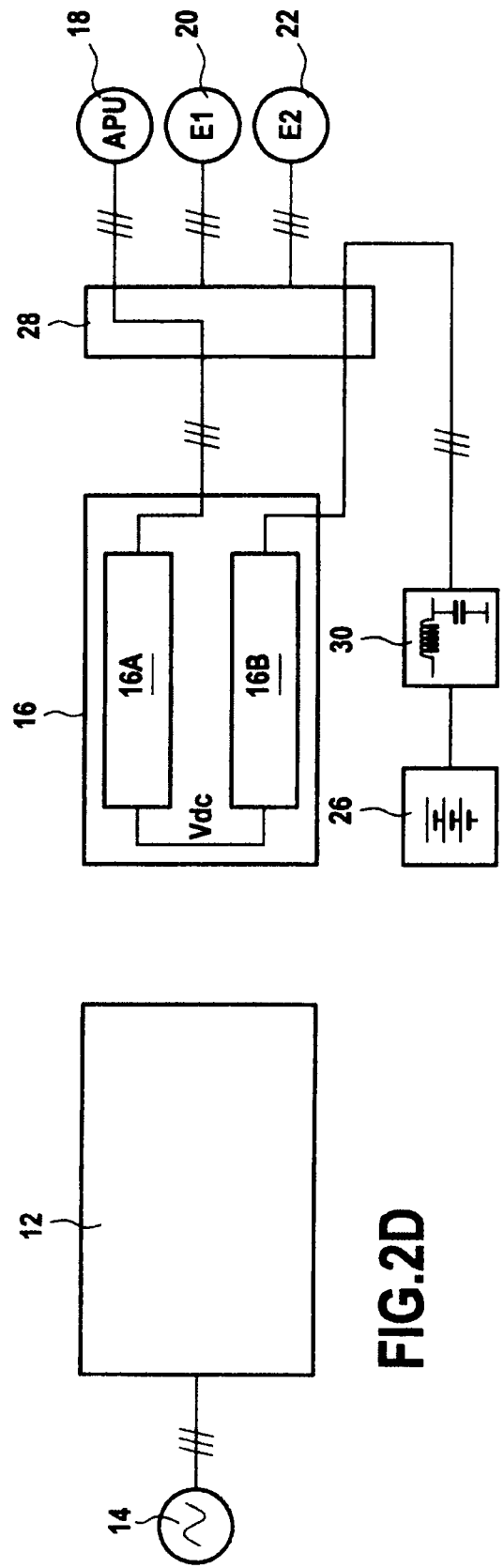

In contrast, in order to start the APU from the battery, as shown in FIG. 2D, two sections of the DC/AC converter are used, but one of them is then dedicated to DC/DC conversion for raising the voltage of the battery, while the other one operates conventionally to perform DC/AC conversion.

Figure 3:
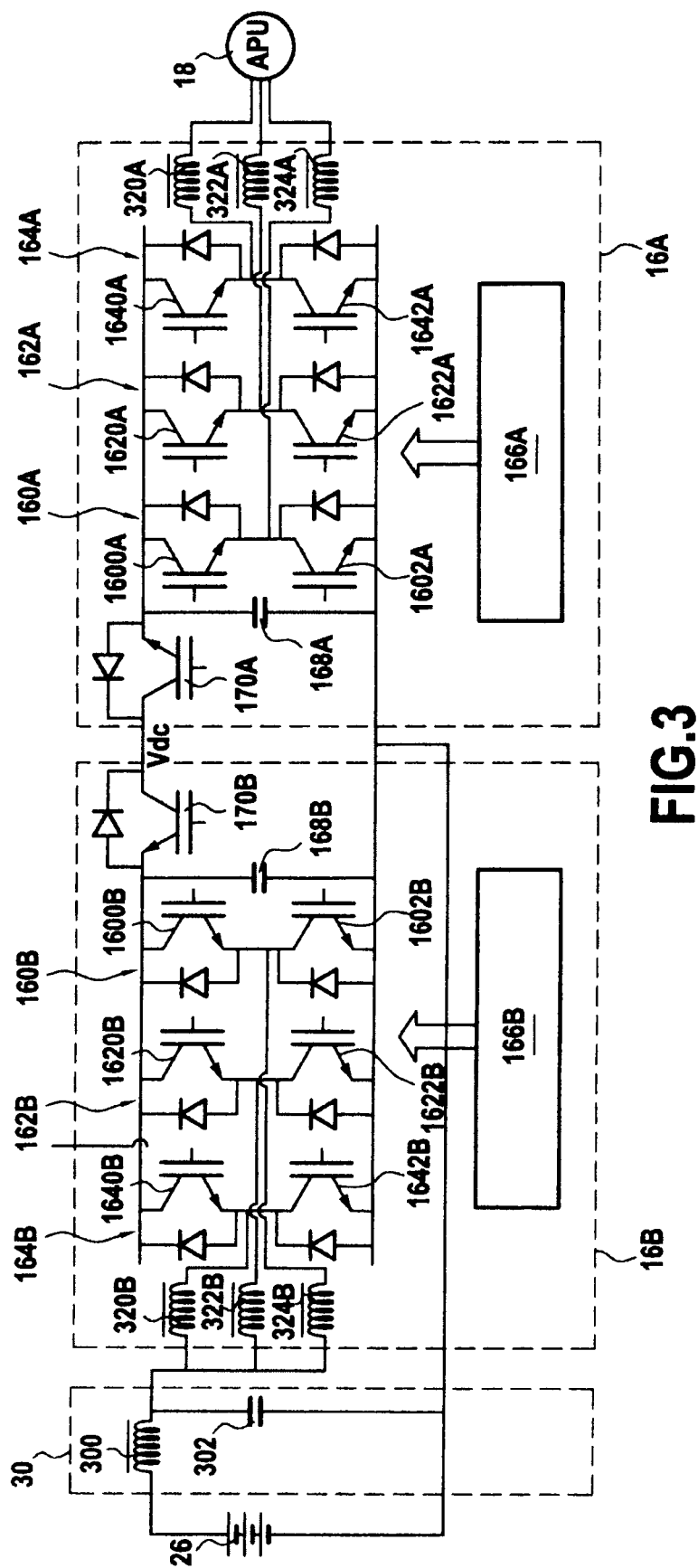
FIG. 3 shows the FIG. 2D configuration in detail.
Figure 4:
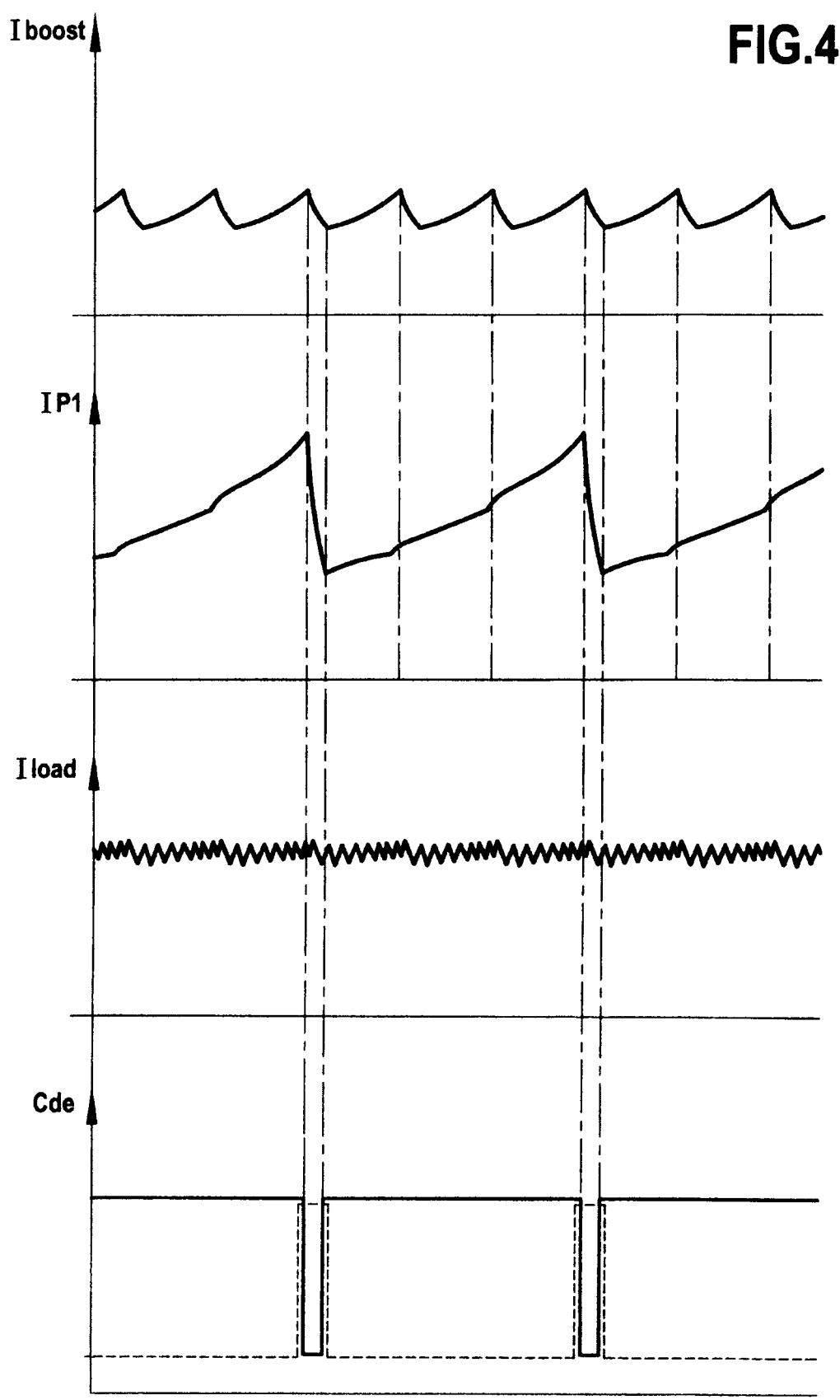
FIG. 4 comprises timing diagrams at certain characteristic points of the FIG. 3 configuration.

FIGS. 3 and 4 show this configuration in greater detail.

FIG. 3 shows the detail of the various circuits enabling the APU 18 to be started from the battery 26, for example.

A filter 30 is connected across the two terminals of the battery 26 (voltage terminal and ground terminal), and in the example shown this filter is a conventional inductor capacitor (LC) type filter having a series inductor 300 and a parallel capacitor 302. One of the output terminals of the filter, constituted by the point of connection between the inductor 300 and the capacitor 302, is connected to the first ends of three inductors 320B, 322B, 324B having their second ends respectively connected to the connection point between the two switches in respective ones of the branches in a section 16B of the DC/AC converter that has one of its power supply lines, constituting a ground line, connected to the other one of the output terminals of the filter, which terminal is itself connected to the ground terminal of the battery.

Thus, the end of the first inductor 324B is connected to the connection point (or midpoint) between the two switches 1600B, 1602B of the first branch 160B of the section 16B of the DC/AC converter. Similarly, the end of the second inductor 322B is connected to the connection point between the two switches 1620B, 1622B of the second branch 162B. Finally, the end of the third inductor 320B is connected to the connection point between the two switches 1640B, 1642B of the third branch 164B. These switches are conventionally IGBTs, each having a corresponding antiparallel diode connected across its terminals and having its switching controlled by a control circuit 166B. A parallel capacitor 168B connects together the two power supply lines of the section 16B of the DC/AC converter and a switch 170B in series in one of the power supply lines delivers the DC voltage $V_{dc}$ of said section 16B on said power supply line. As for the above-described switches, the switch 170B, e.g. an IGBT having an antiparallel diode, is controlled from the control circuit 166B.

At the output from the switch 170B, the DC power supply line of the section 16B of the DC/AC converter is connected directly to the DC power supply line of the other section 16A of the DC/AC converter (since the power supply network is not present, the rectifier does not deliver any voltage and the power supply lines of both sections of the DC/AC converter are thus connected directly), which section 16A is in series with another switch 170A, e.g. an IGBT together with its antiparallel diode and with its switching controlled by a control circuit 166A, with the output thereof having a capacitor 168A connected in parallel so as to deliver the input voltage to the section 16A of the DC/AC converter. Another power supply line for this section 16A, constituting a ground line, is connected to the ground line of the section 16B.

The section 16A of the DC/AC converter presents a structure that is similar to that of the section 16B with the connection point between the two switches 1600A, 1602A of the first branch 160A of said section 16A now being connected to the end of a first output inductor 324A of the inverter. Its other end is connected to one line of the starter-generator of the APU. Similarly, the connection point between the two switches 1620A, 1622A of the second branch 162A is connected to the end of a second inductor 322A. Finally, the connection point between the two switches 1640A, 1642A of the third branch 164A is connected to the end of a third inductor 320A. As for the above-described section, these switches are conventionally IGBTs having respective antiparallel diodes connected to their terminals and having their switching controlled by a control circuit 166A.

The operation of the electrical starter system in this configuration is described below with reference to the simplified timing diagrams of FIG. 4 in which the signal Iboost is the power supply current output from the filter 30, the signal IP1 is the current flowing through any one of the inductors 320B, 322B, 324B, and the signal Iload is the current flowing in the power supply line at the output from the section 16B of the DC/AC converter, and the two additional signals Cde are the two control signals applied to the even and odd switches respectively of the section 16B.

Firstly, it should be observed that the various connectors needed for interconnecting the various circuits are deliberately omitted so as to avoid overcrowding the drawing. However, the person skilled in the art will naturally be able to place them so as to enable only those circuits that are needed for a starting sequence powered by the battery to be activated. In this configuration of starting from the battery 26, the current it delivers is initially filtered by the filter 30, thereby reducing the level of current ripple. The current waveform before filtering is represented by the Iboost plot which shows current that presents ripple at a high frequency corresponding to three times the switching frequency of the switches. The battery voltage applied to the terminals of the three inductors 320B, 322B, 324B connected to the connection points between the switches in the section 16B of the DC/AC converter is used to form a booster DC/DC converter (of the interlaced bidirectional boost type) serving to raise the battery voltage (in practice 24 $V_{dc}$) to the voltage desired as the input voltage of the other section of the DC/AC converter (e.g. for example 270 $V_{dc}$), with the operation thereof for controlling the APU starter-generator under the control of the control circuit 166A itself being conventional. In known manner, the voltage level desired at the output from the section 16B depends on the switching duty ratio, which may advantageously be chosen to be constant as illustrated by the waveform of the signals Cde, in order to avoid stability problems in the voltage servo-control loop, where stability is known to be difficult at such a high voltage boost ratio. The waveform of the current IP1 passing through the inductors shows that the ripple frequency is equal to the frequency of the pulse width modulation applied to the IGBTs, with its mean amplitude being one-third that of the amplitude of Iboost and that its ripple ratio is three times greater than the ripple ratio of Iboost. The interlacing thus makes it possible for the ripple ratio of the current to be processed by the filter 30 to be divided by n (where n=number of phases=3 in the example shown). The filter 30 shown here by way of example is of the single-stage LC type, however various other types of filter could equally well be used. Since the transformation ratio is high, the capacitor 168B is charged by large current peaks of very short duration. Another beneficial effect of the interlacing is that the amplitude of these current peaks is reduced by the factor n (here n=3) and the corresponding frequency is increased by a ratio n, thus making it possible to reduce the stress on the capacitor 168B and improve the effect of filtering. The waveform of the current Iload shows that the current delivered to the other section of the DC/AC converter then presents only a very small level of ripple.

Advantageously, the switches 1640B, 1620B, and 1600B may also be activated (inversely relative to the switches connected in series therewith), so as to obtain a bidirectional converter. This operating principle makes it possible to operate in DC mode regardless of the power supplied. With a fixed duty ratio, the output voltage is then little affected by the load level.

Other possible modes of operation with the electrical system of the invention for starting engines are shown diagrammatically in FIGS. 5A to 5D.

Thus, FIG. 5A shows a system having three inverters of power $P_{max}/2$ that is particularly adapted to operating in circumstances in which the dispatch reliability for starting on the ground is the determining factor. For such starting on the ground, redundancy of the 2 on 3 type ensures a high level of dispatch reliability.

FIG. 5B shows in-flight re-starting with the three-inverter system, in which the reliability ratio is even greater since the redundancy provided is of the 1 on 3 type.

Figure 5C:
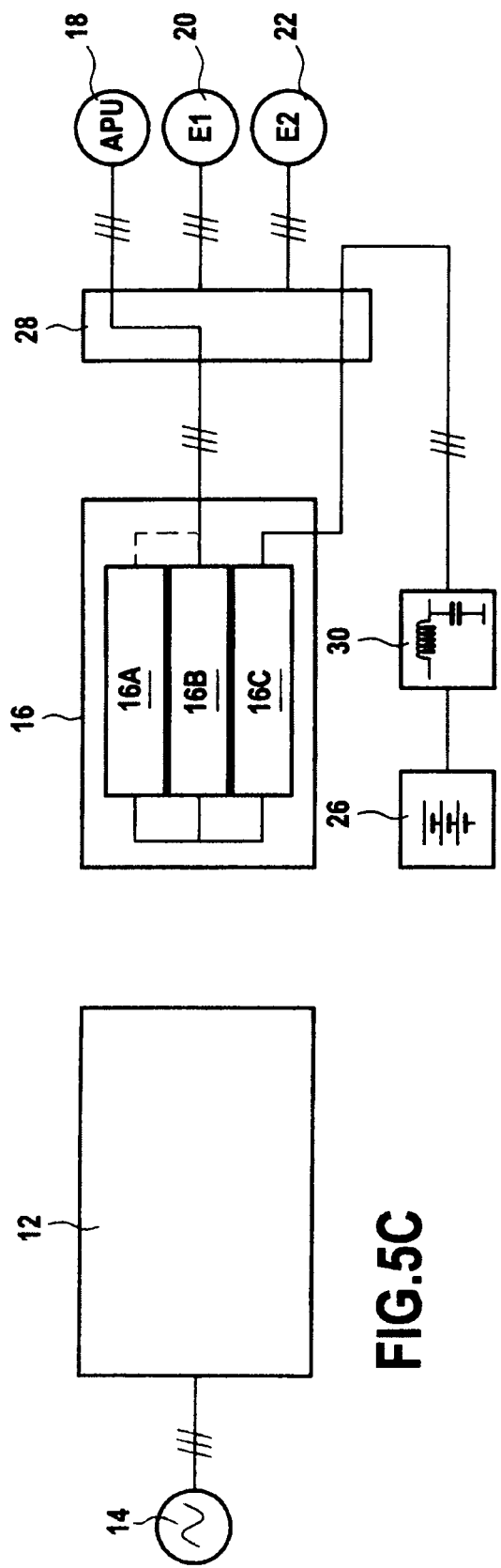

When starting the APU from the battery, as shown in FIG. 5C and as described above, one section of the DC/AC converter is used to boost the battery voltage, and one of the other two is used for DC/AC conversion, thus also making it possible to ensure a high level of dispatch reliability in this configuration of starting from the battery.

Figure 5D:
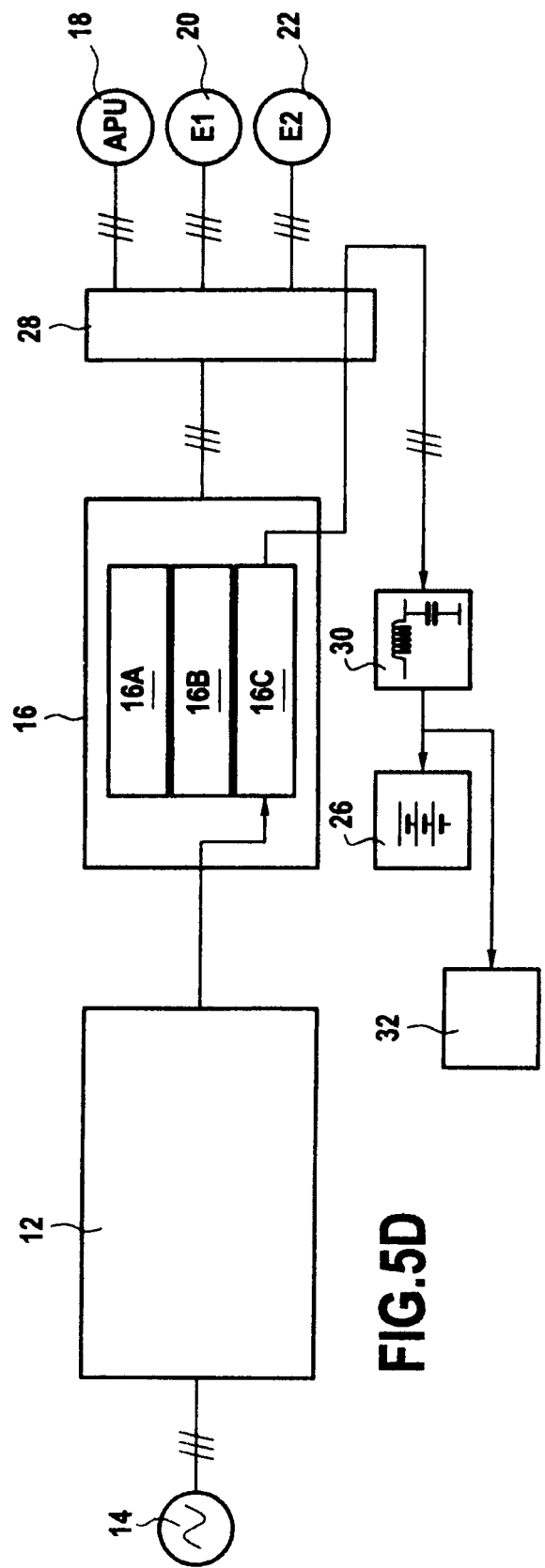

Finally, FIG. 5D shows the system being used for recharging the battery 26 or merely for powering the low voltage DC network 32 of the aircraft, thereby replacing a transformer rectifier unit (TRU). In this mode of operation, a DC/AC converter section is powered by the on-board power network 14 via the AC/DC rectifier 12 and it outputs a DC voltage for the low voltage DC network (e.g. 28 $V_{dc}$) or for charging the battery, or for both. The inverter then operates as an interlaced, multiphase, bidirectional, voltage-lowering (buck type), DC/DC converter.

It should be observed that if for any reason (e.g. a power level greater than $P_n/k$ for in-flight re-starting) the DC/AC converter sections need to present power equal to $P_n$, then the principle of using a section as a DC/DC converter providing an interface with the battery remains valid.

It should be observed that although the description above is given with reference to controlling the starting of aeroengines, it is clear that the invention is applicable in other fields, in particular in the automobile field and in the field of industrial machines. Similarly, although reference is made in the figures to power being supplied by a three-phase network, it is clear that the invention is applicable to any type of n-phase power supply network (with n>1), and thus including a two-phase network.

It should also be observed that when the level of harmonic distortion during engine starting stages is not of major importance, then the AC/DC rectifier 12 may be a simple n-phase rectifier (n=3, generally) followed by a simple filtering inductor. This serves to optimize weight and dissipation.

It should also be observed that even if reference is made to IGBTs for implementing the switches, other types of controlled metal oxide semiconductor (MOS) switch may equally well be used, such as MOS-controlled thyristors (MCTs), bipolar junction transistors (BJTs), or silicon controlled rectifier (SCRs).

The invention claimed is:

1. An electrical system for starting at least one engine, the system comprising:
   an AC/DC rectifier powered by an AC power network to deliver a first DC voltage $V_{dc}$; and
   a DC/AC converter module for delivering a starting AC voltage to said at least one engine from said AC power network or from a battery when the AC power network is unavailable,
   wherein said DC/AC converter module comprises k n-phase bidirectional inverters arranged in parallel (k>1), each delivering power that is no greater than half a maximum power $P_{max}$ required for starting said at least one engine, two power supply lines of each of said n-phase bidirectional inverters being connected to an electronic protection device receiving said first DC voltage $V_{dc}$, and
   wherein the n outputs from at least one of said n-phase bidirectional inverters deliver said starting AC voltage for said at least one engine via n respective series inductors of said DC/AC converter module when the AC power network is available or, when the AC power network is unavailable, via said battery connected to n outputs of a remaining one of said n-phase bidirectional inverters via n associated series inductors to form a DC/DC boost converter, the electronic protection device of which is connected to n inputs of said at least one of said n-phase bidirectional inverters delivering said starting AC voltage via n associated series inductors.

2. An electrical starter system according to claim 1, wherein said DC/AC converter module comprises at least two inverters and each of said k inverters delivers a power $P_{max}/k$.

3. An electrical starter system according to claim 1, wherein said DC/AC converter module includes two three-phase inverters arranged in parallel.

4. An electrical starter system according to claim 3, wherein said at least one engine is capable of starting under safety-critical conditions with said power that is not greater than half the maximum power, and wherein said at least one engine is powered by only one of said two three-phase inverters so as to increase the reliability level of the system in said safety-critical conditions by using redundancy of the 1 on 2 type.

5. An electrical starter system according to claim 1, wherein said DC/AC converter module includes at least three inverters, and each of said k inverters delivers a power $P_{max}/(k-1)$.

6. An electrical starter system according to claim 5, wherein said DC/AC converter module includes three three-phase inverters arranged in parallel.

7. An electrical starter system according to claim 6, wherein said at least one engine is powered by two of said three three-phase inverters so as to increase the reliability level of the system by using redundancy of 2 on 3 type.

8. An electrical starter system according to claim 1, wherein, in order to obtain said DC voltage $V_{dc}$ from said battery, the electrical starter system includes a control circuit with a fixed switching duty ratio for controlling the DC/DC boost converter.

9. An electrical starter system according to claim 1, wherein said electronic protection device includes a controlled switch in series in one of the two power supply lines and a capacitor in parallel across said two power supply lines beside said inverter.

10. An electrical starter system according to claim 1, further comprising a filter arranged at the outlet from said battery.

11. An electrical system for starting, through a DC/AC converter module, at least one engine from an AC power network or from a battery when the AC power network is unavailable, wherein said DC/AC converter module comprises k n-phase bidirectional inverters arranged in parallel (k>1), the n outputs from at least one of said n-phase bidirectional inverters deliver a starting AC voltage for said at least one engine via n respective series inductors of said DC/AC converter module when the AC power network is available or, when the AC power network is unavailable, via said battery connected to n outputs of a remaining one of said n-phase bidirectional inverters via n associated series inductors to form a DC/DC boost converter, the n outputs of which are connected to n inputs of said at least one of said n-phase bidirectional inverters delivering said starting AC voltage via n associated series inductors.

12. An electrical starter system according to claim 10, wherein each k n-phase bidirectional inverters delivers power that is no greater than half a maximum power $P_{max}$ required for starting said at least one engine.

13. An electrical starter system according to claim 10 or claim 11, wherein two power supply lines of each of said n-phase bidirectional inverters are connected to an electronic protection device.

14. An electrical starter system according to claim 1 or claim 11, wherein the electrical starter system is free of a DC/DC converter.

* * * * *